United States Patent Office 3,271,479
Patented Sept. 6, 1966

3,271,479
RESINOUS COMPOSITIONS OF CARBOXYLIC AMIDE INTERPOLYMERS AND UNSATURATED ESTER POLYMERS
Henry A. Vogel and Harold G. Bittle, Gibsonia, Pa., assignors to Pittsburgh Plate Glass Company, Pittsburgh, Pa., a corporation of Pennsylvania
No Drawing. Filed Dec. 21, 1961, Ser. No. 161,269
18 Claims. (Cl. 260—901)

This invention relates to new resinous compositions and more particularly to resinous compositions comprising blends of aldehyde-modified unsaturated carboxylic acid amide interpolymers and homopolymers and interpolymers of acrylates and methacrylates.

Acrylate and methacrylate polymers, hereinafter generically designated as "acrylic polymers" have been widely utilized for many purposes. They are generally humidity-resistant, durable, and do not readily deteriorate with age or when subject to actinic light, ultraviolet or other radiation. Moreover, the acrylic polymers are very resistant to chemical solvents and to changes in their water-white original color.

Because of these outstanding properties, acrylic polymers have been used extensively in many outdoor applications. They have become important as vehicles in automotive finishes; such finishes have excellent durability, excellent gloss retention and excellent lacquer repair adhesion. Because of their solubility in many fast solvents acrylic polymers are particularly adaptable for use in the formulation of "polychromatic" (multi-colored pigmented) finishes, which are substantially free of "mottling."

Acrylic polymers are, however, thermoplastic, and are therefore subject to attack and softening by many solvents. Moreover, abnormally high temperatures tend to soften and distort their form; also, the gloss of films prepared from the acrylic polymers is usually reduced by pigmentation and by the addition of suspending agents such as bentonite.

Another disadvantage in the use of acrylic polymers as the sole vehicle in lacquers is that they can ordinarily be sprayed only at about 14 or 15 percent solids content. Even at these extremely low solids the flow characteristics of the lacquer are poor after they have been applied to a surface. These poor flow characteristics are manifested as an accentuated "orange peel" effect.

Another problem in the application of coatings containing acrylic polymers is in the selection of a base coat or primer for the acrylic lacquers. It is usually difficult to obtain good adhesion between a baking primer and the acrylic lacquer top coat. Even the primer top coat systems having apparently good adhesion are not uniformly resistant to continuous wide fluctuations in temperature. This weakness is usually manifested by cracking in the top coat.

In a copending application, Serial No. 749,583, filed July 21, 1958, now United States Patent No. 3,037,963, there is disclosed a process for producing useful resinous products from unsaturated carboxylic acid amides such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde in the presence of an alcohol such as butanol. The resulting resins range from soft, flexible materials to very hard solids, depending upon the choice of monomers utilized in preparing the amide interpolymer which in turn is reacted with the aldehyde and the alcohol.

It has now been discovered that these aldehyde-modified amide interpolymers can be blended advantageously with various acrylic polymers including homopolymers and interpolymers of acrylates and methacrylates.

The blends of the instant invention form coatings and films which are outstanding in appearance, gloss, color retention, moisture resistance, stain resistance, grease resistance, heat resistance, detergent resistance, corrosion resistance, adhesion and flexibility. They are particularly adaptable as a composition for use as appliance and automotive finishes. Moreover, these coatings and films have all of the advantages of acrylic polymers with substantially none of the disadvantages. The baked films manifest an apparent cure and can be applied in areas of utility normally restricted to thermosetting compositions. Additionally, the top coats have improved impact resistance, chip resistance and initial gloss over top coats made from either component singly; the top coats have the excellent adhesion of a thermosetting enamel to a baking primer and the excellent post-baking polishability of a lacquer. Even though the resinous compositions of the instant invention form thermosetting vehicles for enamels, they provide for excellent repair adhesion to lacquers or most other air-drying materials which may be used for automotive repairs.

The presence of the aldehyde-modified unsaturated carboxylic acid amide interpolymer in the blends of the present invention also greatly improves the flow characteristics of the acrylic polymers. The acrylic polymers must be sprayed at about 14 or 15 percent solids while the blends of the instant invention may be formulated and sprayed at a solids content of up to 35 percent.

Because of the good compatibility existing between the unsaturated carboxylic acid amide interpolymers and acrylic polymer resins, it is possible to prepare a variety of pigment pastes using the unsaturated carboxylic acid amide interpolymers, and then utilizing the pastes in conjunction with the acrylic polymers. This is quite an advantage because of the fact that it is extremely difficult to wet the majority of pigments with an acrylic polymer resin, while pigments may be easily ground in a normal pebble mill with the said interpolymers in order to prepare a pigment paste. Acrylic lacquers which have been pigmented using an aldehyde-modified unsaturated carboxylic acid amide interpolymer prepared pigment paste usually contain about 7 to 8 percent of the said interpolymer, but where a pigment paste is prepared by just using the interpolymer in the initial grind, the lacquer may contain as little as 2 percent of the said interpolymer.

To present invention is characterized by a resinous composition comprising a thermosetting interpolymer of an unsaturated carboxylic acid amide and at least one other monomer, said interpolymer being characterized by having at least one hydrogen atom of an amido nitrogen replaced by the structure (I)

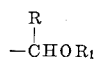

wherein R is a member selected from the group consisting of hydrogen and lower alkyl and $R_1$ is a member selected from the group consisting of hydrogen, lower alkyl preferably containing from 1 to 12 carbon atoms, and alkoxyethyl radicals, and a thermoplastic polymer of at least one compound represented by the general formula:

(II) 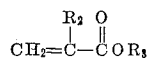

wherein $R_2$ represents a member selected from the group consisting of hydrogen and a lower alkyl group preferably having from 1 to 4 carbon atoms and $R_3$ is an alkyl group having from about 1 to 20 carbon atoms.

In the preparation of the aldehyde-modified amide interpolymer resin an unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

(III) 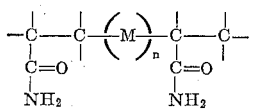

wherein M represents a unit of a monomer polymerizable with acrylamide, and $n$ represents a whole number greater than 1. For example, if styrene were utilized as the second monomer, M would represent the unit:

(IV) 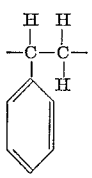

The short chain interpolymer then reacts with an aldehyde, as represented by formaldehyde, to give the structure:

(V) 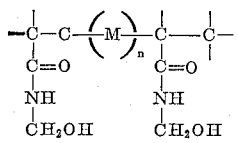

wherein M and $n$ have the significance set forth hereinabove.

In the event the aldehyde is utilized in the form of a solution in butanol or other alkanol, etherification will take place so that at least some of the methylol groups in the above structure will be converted to groups of the structure of Formula I.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol, or cyclic alcohols. The reaction products of glycols with monohydroxy alcohols may also be used. These products are commonly known by the trade name Cellosolve.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide to form the amide interpolymers useful in the present invention. Examples of such monomers include the following:

(1) Monoolefinic hydrocarbons, that is monomers containing only atoms of hydrogen and carbon, such as styrene, alpha-methyl styrene, alpha-ethyl styrene, alpha-butyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3- trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4,-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene, and the like;

(2) Halogenated monoolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para - fluorostyrenes, 2,6 - dichlorostyrene, 2,6 - difluorostyrene, 3-fluoro-4-chlorostyrene, 3-chloro-4-fluorostyrene, 2,4,5 - trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrachloroethylene, 1,1,2,2-tetrafluoroethylene and 1-chloro-2,2,2-trichloroethylene;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate, and similar vinyl halobenzoates, vinyl p-methoxybenzoate, vinyl o-methoxybenzoate, vinyl p-ethoxybenzoate, methyl methacrylate, propyl methacrylate, ethyl methacylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate, and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl aceto-acetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ols;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like;

It is to be understood that the above polymerizeable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymers and resinous blends thereof with vinyl halides, epoxide, nitrocellulose, alkyd resins, epoxidized oils and other resinous materials are described in detail in U.S. Patents 2,870,116, 2,870,117, 2,940,943, -4, -5, and 2,978,437 respectively, the disclosures of which are incorporated herein by reference.

In carrying out the polymerization reaction a peroxygen type catalyst is ordinarily utilized. Useful catalysts for this purpose include acetyl benzoyl peroxide, hydroxyheptyl peroxide, methylethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of two or more of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalysts systems can also be employed.

The quantity of catalyst employed can be varied considerably; however, in most instances it is desirable to utilize from about 0.1 percent to 20.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of an unsaturated carboxylic acid amide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like, can be used to secure low molecular weights, as can unsaturated fatty acids or esters.

The polymerization is best carried out by admixing the polymerizable amide and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out of the polymerization of the very rapid reaction rate and because the reaction is highly exothermic. Some control of the heat of reaction is obtained by adding the amide to the polymerization mixture incrementally. Good agitation is also desirable.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine is generally preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize approximately two equivalents of aldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of aldehyde for each amide group in the interpolymer, or as low as about 0.2 equivalent of aldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomer(s) and refluxing the resulting mixture for a period of from about 3 to about 5 hours until the desired viscosity is obtained. The water of condensation can be removed by azeotropic distillation, as may a portion of the solvent if desired. In fact, when the aldehyde is utilized in the form of a solution in an alkanol such as butanol, it is desirable that approximately half of the butanol be distilled off at the end of the reaction period and replaced by another solvent, such as xylol. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the CH$_2$=C< monomers set forth hereinabove. This method, described in copending application Serial No. 749,583, filed July 21, 1958, does not require reaction of the polymer with an aldehyde since the N-alkoxyalkyl amide monomers already contain

groups, wherein R and R$_1$ have the meaning set forth above.

Regardless of the method by which the resinous material is obtained, it will contain in the polymer chain recurrent groups of the structure (VI)

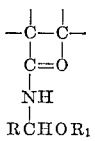

wherein as before designated R is hydrogen or a lower aliphatic hydrocarbon radical, and R$_1$ is hydrogen or the radical derived by removing the hydroxyl group from an alcohol. Thus, when the reaction is carried out in the presence of an alcohol, the alcohol reacts so that at least some, and preferably more than about 50 percent of the radicals R$_1$ will represent the radical derived from the alcohol. When the aldehyde is utilized alone, that is, not in an alcohol solution, the radical R$_1$, of course, will represent hydrogen. The free valences in the above structure may be satisfied with either hydrogen or hydrocarbon depending upon the amide which is utilized in the interpolymerization reaction.

The acrylic polymer resins which may be blended with the aldehyde-modified amide interpolymers vary considerably; both the hard, tough, plastic polymethyl methacrylates and the soft rubbery type such as polyethyl acrylate may be employed in the instant invention. Moreover, the length of the side chain of the normal alcohol esters may be varied widely. Very useful blends are obtained from blends of the amide interpolymers with acrylic esters which are composed of copolymers of methyl methacrylate and lauryl methacrylate. Homopolymers and copolymers of tetradecyl, hexadecyl and octadecyl acrylates and methacrylates are also useful in preparing blends with the instant acrylamide interpolymers.

Examples of specific acrylate and methacrylate esters which may be employed to form useful polymers include the alkyl, aralkyl, alkaryl and aryl esters of acrylic acid and methacrylic acid, such as methyl acrylate, ethyl acrylate, propyl acrylate, butyl acrylate, amyl acrylate, methyl methacrylate, ethyl methacrylate, butyl methacrylate, 2-ethyl-hexyl methacrylate, hexyl methacrylate, octyl methacrylate, lauryl methacrylate and the like.

It is many times an advantage to employ one or more of the above-mentioned ethylenically unsaturated compounds as a comonomer with the acrylate or methacrylate monomer in the preparation of the thermoplastic acrylate polymer. The copolymers used in the preparation of the compositions of the instant invention are composed predominantly of an acrylate monomer (at least about 50 percent by weight of the interpolymer) and preferably at least about 70 percent of the acrylate. The remainder of the copolymer may comprise one or more of the hardening monomers such as styrene, acrylonitrile, and vinyl toluene, or the softening monomers such as vinyl acetate, dibutyl itaconate and butadiene.

Some of the commercially available acrylic polymers which may be employed in the present invention include the Hypalon series, P-1, P-2, P-4, P-5, P-6, and the Acryloid series A-10, A-101, V-72, V-10, LV-L-10. Generally, however, those acrylic polymers which have been modified with small amounts of acid are preferred (about 2 to 6 percent acid in many instances significantly improves the compatibility); however, many useful and compatible blends are obtained from the non-acid containing resins. The molecular weights of these acrylic polymers range from about 2,000 to 175,000 or higher. Their properties range from viscous colorless oils which are benzene-soluble and rather fluid, to very tough, nonflowable high viscosity benzene-isoluble compositions. It is preferred that the molecular weights be in the range of about 50,000 to about 100,000.

A particularly useful and preferred group of methyl methacrylate copolymers which may be employed in the preparation of top coat lacquers are copolymers of methyl methacrylate with at least 10 percent by weight of another alkyl ester of an unsaturated carboxylic acid such as acrylic acid, methacrylic acid, itaconic acid, and the like. A full and detailed description of these resinous compositions is more fully set forth in copending applications Serial No. 584,474, filed May 14, 1956 now abandoned, and Serial No. 108,292, filed May 8, 1961, now U.S. Patent No. 3,194,777.

The modifying monomer, that is, the alkyl ester of an unsaturated carboxylic acid, is preferably utilized in an amount of about 10 percent to about 30 percent by weight, and the methyl methacrylate in an amount of about 70 to 90 percent by weight. However, amounts as high as 50 percent by weight of the alkyl ester also may be utilized to give copolymers which impart the desired characteristics to coating compositions. The exact quantity of the alkyl ester of an unsaturated carboxylic acid employed will depend, of course, on the particular ester utilized; for example, those monomers with the most plasticizing ability, such as ethyl acrylate, butyl acrylate, octyl acrylate, lauryl methacrylate and decyl-octyl methacrylate should be used in smaller amounts. Generally, the alkyl groups may contain from 2 to 18 carbon atoms; preferably, however, they should contain at least 8 carbon atoms. Lauryl methacrylate is particularly preferred.

The copolymers of methyl methacrylate and alkyl methacrylate in which the alkyl group contains at least 8 carbon atoms should possess a relative viscosity (N$_r$) in the range of 1.150 to 1.260, and preferably 1.180 to 1.250, to function satisfactorily in coating compositions. Relative viscosity (also known as viscosity ratio) is defined as follows:

$$N_r = \frac{\text{efflux time of polymer solution in seconds}}{\text{efflux time of solvent solution in seconds}}$$

The efflux times are measured in accordance with the procedure of A.S.T.M. D-445-46T (Method B) using used up during the reaction. Amounts of about ½ percent to 1 percent based on the monomer solids should be added after each 1- to 2-hour interval. As previously mentioned, it has proved advantageous to blend minor amounts (5 to 10 percent by weight) of an epoxy resin or other film forming material with the said unsaturated carboxylic acid amide interpolymer. This may be done by hot or cold blending. The reaction mass is then refluxed with an azeotropic distillation for a substantial length of time (about 3 hours) to remove the water of reaction.

EXAMPLES I-N

These examples illustrating particular acrylic polymers are set forth in Table II and are prepared by refluxing the monomer reactants in a suitable hydrocarbon solvent such as benzene or toluene in the presence of a free radical initiating catalyst such as benzoyl peroxide until maximum conversion is obtained. In order to effect maximum conversion, small increments of catalyst (about 1 to 2 parts) may be added in a hydrocarbon solution during the reaction. It has proved advantageous to add the said catalyst at intervals ranging from about every 1½ to 2 hours.

Alternately the acrylic polymers may be prepared by suspension or bead polymerization techniques. This technique includes forming two solutions; one of the reactant monomers, catalyst and chain stopper, and one of water protective colloid and buffer. The two solutions are then mixed, in a vessel equipped with thermometer, condenser and stirrer. Agitation is maintained for the entire reaction time, during which the temperature, is maintained for at least 1½ hours at 75° C. to 78° C.

EXAMPLE Q

A pigment paste was prepared as follows:

| | Parts by wt. |
|---|---|
| Aluminum pigment (Alcoa 222) | 600 |
| Product of Example L (methyl methacrylate, dibutyl itaconate copolymer) | 149 |

The above ingredients were ground in a Baker-Perkins mill for 30 minutes and intermixed with the following ingredients:

| | Parts by wt. |
|---|---|
| Product of Example L (methyl methacrylate, dibutyl itaconate copolymer) | 324 |
| Toluene | 89 |
| Butyl Cellosolve | 48 |

As previously mentioned, many of the resinous blends of the instant invention may be advantageously employed as top coats in automotive finishes. These blends have excellent adhesion to all of the well-known baking primers, the majority of which have only poor adhesion at best to the thermoplastic polyacrylate top coats. These baking primers include those composed of drying oil-modified alkyds, rosin-modified alkyds, mixed or co-reacted alkyds and amino-formaldehyde resins, mixed or co-reacted alkyds and epoxy resins, mixed or inter-reacted alkyd, amino-formaldehyde, epoxy resins, mixed or interreacted esterified epoxy resins with the higher fatty acids with amino-formaldehyde resins with or without alkyds.

A representative baking primer which was used in the

*Table II*

| Materials | Example (Parts by Weight) | | | | | |
|---|---|---|---|---|---|---|
| | I* | J* | K | L | M | N* |
| Methyl methacrylate | 90.00 | 1,080.00 | 952.0 | 12.8 | 12.8 | 225.000 |
| Lauryl methacrylate | 10.00 | 120.00 | 420.0 | | | 25.000 |
| Dibutyl itaconate | | | | 6.0 | | |
| Tertiary dodecyl mercaptan | 0.75 | 15.00 | | | | 1.880 |
| Benzoyl peroxide | 1.00 | 12.00 | 10.5 | 0.3 | 0.4 | 2.920 |
| Cyanamer 370 (15% water solution) | 2.00 | 27.60 | | | | |
| Disodium phosphate | 0.10 | 15.10 | | | | 3.160 |
| Monosodium phosphate | 1.70 | 0.94 | | | | .196 |
| Water | 290.06 | 2,760.00 | | | | 575.000 |
| Methacrylic acid | | | 28.0 | 1.2 | 1.2 | |
| Toluene | | | 2,100.0 | 28.0 | 15.0 | |
| Acetone | | | 420.0 | 12.0 | | |
| Cellosolve acetate | | | 420.0 | | | |
| Butanol | | | | 2.0 | 15.0 | |
| Kofilm #50 | | | | | | 2.500 |

*Suspension polymerization technique used.

EXAMPLE O

A pigment paste was prepared as follows:

| | Parts by wt. |
|---|---|
| Titanium dioxide | 460 |
| Product of Example I | 139 |

These two ingredients were placed in a Baker-Perkins mill and ground for 20 minutes. Two hundred and fifty (250) parts of the product of Example I, 56 parts of xylene and 6 parts of butyl Cellosolve were then added as letdown and the mixture was ground until homogeneity was obtained.

EXAMPLE P

| | Parts by wt. |
|---|---|
| Aluminum pigment (Alcoa 222) | 38 |
| Product of Example K (methyl methacrylate, lauryl methacrylate copolymer) | 50 |
| Cellosolve acetate | 12 |

The above ingredients were ground in a pebble mill for about 16 hours.

following Examples 1-10 was prepared with the following vehicle composition:

| | Parts by wt. |
|---|---|
| Alkyd resin modified with styrene and methyl methacrylate (39% glycerol ester of a 2:1 blend of soya oil and dehydrated castor oil, 37.5% glycerol phthalate and 3.5% excess glycerine and copolymerized with 10% styrene and 10% methyl methacrylate) | 21.5 |
| Epoxy ester (32% fractionated cottonseed acid, iodine value of 132 minimum, 68% Epon 1004, acid No. 7 as 50% solids in xylene) | 62.0 |
| Urea-formaldehyde resin (naphtha tolerance, 10 gms. in 36-40 ml. of naphtha aliphatic hydrocarbon) | 5.5 |
| Epoxy resin (Union Carbide's ERL 2774 or Shell's Epon 834) | 11.0 |

The above components were formulated using suitable pigments, solvents, drier (e.g. cobalt naphthenate) and suspending agents, adjusted to a spraying viscosity and sprayed on phosphatized steel panels (Bonderite 100).

as the oil of said procedure (1) a solution of 0.25 gram of dichloride, and (2) a sample of the ethylene dichloride utilized in making the solution. The determinations are run at 25° C. in an Ostwald viscometer, Series 50.

The above relative viscosity range of 1.150 to 1.260 corresponds to a molecular weight in the range of about 87,000 to 150,000. The equation utilized in determining molecular weight is as follows, wherein the constants for polymethyl methacrylate are employed:

$$M.W. = 1.47 \times 10^6 (N_r - 1 - \ln N_r)^{0.65}$$

where $N_r = \dfrac{\text{efflux time of polymer solution in seconds}}{\text{efflux time of solvent solution in seconds}}$ While the resinous compositions of the instant invention are preferably composed solely of the thermoplastic acrylic component and the thermosetting aldehyde-modified acrylic interpolymer, minor amounts of other film-forming materials may be added. These other materials may serve either as a filler material or as an agent for cornering certain specific properties or effects. Excellent compositions are obtained using about 5 percent to about 10 percent melamine-formaldehyde resin, about 5 percent to about 10 percent of an alkyd resin or both.

Preferably, these additional film-forming materials are first incorporated into a compatible blend with the aldehyde-modified amide interpolymer and subsequently added to the thermoplastic acrylic component. A detailed and complete disclosure of the said interpolymer blends with the additional materials may be found in the above-mentioned U.S. patent applications.

In order to obtain resinous blends of the instant invention which will have the optimum in properties, it is preferred that from about 25 to about 75 percent by weight of the aldehyde-modified amide interpolymer be blended with the acrylic polymer. For automotive top coats it is preferred that at least 35 percent by weight of the resinous composition comprise the thermoplastic acrylic polymer. However, because of the fact that in most instances the resins are mutually compatible in all proportions, valuable blends may be prepared using as little as 2 to 5 percent of one of the resins.

No special expedients are necessary in formulating the coating compositions of this invention. For example, they may be prepared simply by admixing a solution of the aldehyde-modified acrylamide interpolymer with a solution of the polyacrylate. Mass blending may be utilized if the temperature is kept below the curing temperature of the aldehyde-modified acrylamide interpolymer. The solvents utilized are likewise not material, and any solvent or solvents which will dissolve the resinous component may be employed. For example, esters, ketones, chlorinated hydrocarbons and aromatic hydrocarbons may be employed. In certain instances alcohols such as isopropyl and butyl alcohol are utilizable. The acrylate ester monomers themselves may be advantageously employed in formulating certain of the blends. Ketones such as acetone and methyl ethyl ketone and aromatic hydrocarbons such as benzene, toluene and xylene dissolve both the polyacrylates and the amide interpolymer in a wide range of compositions.

Pigments such as titanium dioxide, carbon black, and the like may be added to the coating compositions to form any desired color. Other ingredients normally present in coating compositions, such as germicides, fillers, driers, and the like may be added. Ordinarily, when an internal catalyst such as acrylic acid or methacrylic acid or the like is present in the interpolymer no additional catalyst is needed to promote the cure of the films obtained from coating compositions disclosed herein. However, in the event the interpolymer does not contain an internal catalyst it is desirable to add an acidic material shortly before the composition is to be utilized. Suitable catalysts for this purpose include citric acid, tartaric acid, phosphoric acid, as well as latent catalysts, that is, materials which decompose into acidic materials when heated. Suitable cures may also be obtained in the absence of any catalyst although slightly higher temperatures or baking times may be necessary when a catalyst is not present. Through the use of acrylic polymers, however, it is possible to obtain excellent coating compositions having very good mar resistance, flexibility, color retention and chemical resistance when baking temperatures ranging from 200° F. to 250° F. are employed.

The following specific examples illustrate the preparation of aldehyde-modified amide interpolymers, and acrylic polymers, and the utilization of mixtures of these materials in coating compositions. The examples are not intended to limit the invention, however, since many modifications can be made in the procedures described.

EXAMPLES A–H

These examples, illustrating particular amide interpolymers, are set forth in following Table I and are prepared simply by refluxing the amide and the other comonomers in the presence of one of the aforementioned catalysts such as cumene hydroperoxide and a chain transfer agent in an alcohol solution or in an alcoholic hydrocarbon solvent mixture (about 50 to 100 percent based on the weight of the reactant monomers). After about 60 percent to 70 percent of the monomers have been converted, formaldehyde in the form of paraformaldehyde or an alkyl Formcel (40 percent butyl alcohol solution of formaldehyde) is added with a small amount of maleic anhydride. In order to obtain maximum conversion of the reactive monomers it is usually necessary to add a catalyst (cumene hydroperoxide) during the course of the polymerization, the reason being that the said catalyst is

*Table I*

| Materials | Example (Parts by Weight) | | | | | | | |
|---|---|---|---|---|---|---|---|---|
| | A | B | C | D | E | F | G | H |
| Acrylamide | 150.0 | 225.0 | 30.0 | 3.0 | 45.0 | 30.0 | 45.0 | 600 |
| Styrene | 375.0 | 577.5 | 130.5 | 7.7 | 247.5 | 77.0 | 247.5 | 2,610 |
| Ethyl acrylate | 975.0 | 660.0 | 132.0 | | | 88.0 | | |
| Tertiary dodecyl mercaptan | 15.0 | 22.5 | 3.75 | 0.6 | 3.0 | 3.0 | 6.0 | 80 |
| Methyl methacrylate | | | | 8.9 | | | | 2,640 |
| Methacrylic acid | | 37.5 | 7.5 | 0.5 | 7.5 | 5.0 | 7.5 | 150 |
| Cumene hydroperoxide | 45.0 | 37.5 | 9.0 | 0.5 | 9.55 | 6.5 | 10.5 | 180 |
| Butyl Formcel | 318.0 | 477.0 | 63.6 | 6.3 | 95.3 | 63.5 | 95.4 | 1,272 |
| Maleic anhydride | 4.3 | 6.0 | 0.8 | 0.08 | 1.27 | 0.85 | 1.26 | 16 |
| Solvesso 150 (High boiling aromatic solvent, B.P. about 185° C.–200° C.) | 808.5 | | | | | | | |
| Butanol | 750.0 | 750.0 | 75.0 | 10.0 | 150.0 | 100.0 | 150.0 | 1,500 |
| Toluene | | 937.0 | 150.0 | 10.0 | 175.0 | 100.0 | 141.0 | 3,000 |
| Xylene | | | 75.0 | | | | | |

The coated panels were then baked for 30 minutes at 350° F.

EXAMPLE 1

| | Parts by wt. |
|---|---|
| Pigment paste of Example O (TiO₂ pigment in methyl methacrylate, lauryl methacrylate copolymer) | 82 |
| Product of Example J (methyl methacrylate, lauryl methacrylate copolymer) | 163 |
| Product of Example C (formaldehyde-modified interpolymer of acrylamide, styrene, ethyl acrylate and methacrylate acid) | 60 |
| Butyl Cellosolve | 84 |
| Xylene | 171 |

The above formulation was adjusted to a suitable spraying viscosity (20 percent total solids) and applied to primed phosphatized steel panels (Bonderite 100). The panels were then baked for 30 minutes at 180° F. The baked films had a gloss of 90.

EXAMPLE 2

| | Parts by wt. |
|---|---|
| Pigment paste of Example O (TiO₂ pigment in methyl methacrylate, lauryl methacrylate copolymer) | 82 |
| Product of Example I (methyl methacrylate, lauryl methacrylate copolymer) | 134 |
| Product of Example C (formaldehyde-modified interpolymer of acrylamide, styrene, ethyl acrylate and methacrylic acid) | 80 |
| Butyl Cellosolve | 65 |
| Xylene | 104 |

The above formulation was adjusted to a suitable viscosity and sprayed on primer phosphatized steel panels (Bonderite 100). The panels were then baked for 30 minutes at 225° F. The baked films had a gloss of 93 and an impact of 80 inch/pounds when measured with a Gardner variable impact tester.

EXAMPLE 3

A pigment paste was prepared by grinding 600 parts of titanium dioxide pigment with 139 parts of the product of Example I in a Baker-Perkins mill for 20 minutes. Two hundred and eighty (280) parts more of the product of Example I with 56 parts of xylene and 25 parts of butyl Cellosolve were then added to the mill. The mixture was ground further to effect homogeneity. A lacquer was then prepared from the following formulation:

| | Parts by wt. |
|---|---|
| Pigment paste as prepared above | 73 |
| Product of Example N (methyl methacrylate, lauryl methacrylate copolymer) | 139 |
| Product of Example C (formaldehyde-modified interpolymer of acrylamide, styrene, ethyl acrylate and methacrylic acid) | 80 |
| Butyl Cellosolve | 40 |

This formulation was then adjusted to a suitable viscosity and sprayed on primed phosphatized steel panels (Bonderite 100). Some of the panels were then baked for 20 minutes at 180° F. and some of the panels were baked for 20 minutes at 250° F. The baked films had excellent humidity resistance after 500 hours of exposure to an environment maintained at 100° F. and 100 percent humidity. The films also had a gloss of 91 at 60°.

The compositions set forth in Table III were applied and tested in the manner outlined in Example 3 with the same good results.

*Table III*

| Materials | Example (Parts by Weight) | | | | | | |
|---|---|---|---|---|---|---|---|
| | 4 | 5 | 6 | 7 | 8 | 9 | 10 |
| Pigment paste as prepared in Example 3 | 73 | 73 | | | | | |
| Pigment paste of Ex. P | | | | 12 | 12 | 12 | 6 |
| Product of Ex. H (formaldehyde-modified acrylamide, styrene, methyl methacrylate, methacrylic acid polymer) | | | | 80 | 140 | 100 | 40 |
| Product of Ex. C (formaldehyde-modified acrylamide, styrene, ethyl acrylate, methacrylic acid polymer) | 80 | 80 | 90 | | | | |
| Product of Ex. N (methyl methacrylate, lauryl methacrylate copolymer) | 139 | 119 | | | | | |
| Product of Ex. L (methyl methacrylate, dibutyl itaconate, methacrylic acid copolymer) | | | 72 | | | | |
| Dioctyl phthalate | | 5 | | | | 10 | |
| Melamine-formaldehyde resin | | | 40 | | | | 5 |
| Toluene | 20 | 16 | 25 | 130 | 109 | 144 | |
| Cellosolve acetate | 20 | 39 | 25 | 44 | 38 | 50 | |
| Pigment paste of Ex. Q | | | 80 | | | | |
| Product of Ex. K (methyl methacrylate, lauryl methacrylate, methacrylic acid interpolymer) | | | | 144 | 69 | 94 | 55 |

In addition to the resinous compositions set forth in the preceding examples, valuable and useful blends have been obtained from the following:

Mixtures of Acryloid B-82 with methylolated acrylamide interpolymers containing about 65 percent ethyl acrylate, about 25 percent styrene and about 10 percent acrylamide;

Mixtures of the product of Example K with equal amounts of the product of Example A or the product of Example F;

Mixtures containing 25 percent, 50 percent and 75 percent of an interpolymer containing 44 percent butyl acrylate, 44 percent methyl methacrylate, 6 percent methacrylic acid and 6 percent hydroxy propyl methacrylate with the product of Example B;

The product of Example C or an aldehyde-modified interpolymer of 15 percent acrylamide, 82.5 percent styrene and 2.5 percent methacrylic acid;

Mixtures containing 25 percent, 50 percent and 75 percent of the product of Example B with interpolymers of methyl methacrylate containing 30 percent dibutyl itaconate and modified with 2, 4, and 6 percent methacrylic acid or with 30 percent lauryl methacrylate modified with 6 percent methacrylic acid.

Equally good coating materials are obtained when straight homopolymers of the compounds represented by above Formula II and of the interpolymers containing the unit represented by Formula VI are blended together.

Additionally good blends are obtained from blends of the various aldehyde-modified amide interpolymers with copolymers of acrylate esters and methacrylate esters with and without minor amounts of other compounds containing the $CH_2=C<$ group.

Although specific examples have been set forth hereinabove, it is not intended that the invention be limited solely thereto, but to include all of the variations and modifications falling within the scope of the appended claims.

We claim:

1. The resinous composition which consists essentially of a thermosetting interpolymer consisting of an unsaturated carboxylic acid amide and at least one other monomer containing a $CH_2=C<$ group, said interpolymer containing from about 2 percent to about 50 percent by weight of said amide in polymerized form and being characterized by having at least one hydrogen atom of the amido nitrogen replaced by the structure $$-\underset{\underset{R}{|}}{C}HOR_1$$

wherein R is a member selected from the group consisting of hydrogen and lower alkyl and $R_1$ is a member selected from the group consisting of hydrogen, alkyl and alkoxy ethyl radicals, and a thermoplastic polymer consisting of one or more ethylenically unsaturated esters represented by the general formula $$CH_2=\underset{\underset{R_2}{|}}{C}-\overset{\overset{O}{\|}}{C}OR_3$$

wherein $R_2$ represents a member selected from the group consisting of hydrogen and a lower alkyl group having from 1 to 4 carbon atoms and $R_3$ is an alkyl group having from about 1 to 20 carbon atoms.

2. The resinous composition of claim 1 wherein the said thermosetting interpolymer is present in amounts ranging from 2 to about 98 percent and the thermoplastic polymer is present in amounts ranging from about 98 percent to about 2 percent.

3. The resinous composition of claim 1 wherein the thermosetting interpolymer is present in amounts ranging from about 25 percent to 75 percent and the thermoplastic polymer is present in amounts ranging from about 75 percent to about 25 percent.

4. The resinous composition of claim 1 wherein the compound represented by the general formula $$CH_2=\underset{\underset{R_2}{|}}{C}-\overset{\overset{O}{\|}}{C}OR_3$$

wherein $R_2$ and $R_3$ have the same meaning where at least one compound represented by the general formula is present in amounts ranging from about 50 percent to about 100 percent.

5. The resinous composition of claim 1 wherein the said thermoplastic polymer contains an unsaturated carboxylic acid component.

6. The resinous composition of claim 1 wherein the thermoplastic polymer consists of methyl methacrylate and lauryl methacrylate in polymerized form.

7. The resinous composition of claim 6 wherein the thermosetting intrpolymer is an interpolymer of acrylamide, styrene and ethyl acrylate.

8. The resinous composition of claim 6 wherein the thermosetting interpolymer is an interpolymer of acrylamide, styrene, ethyl acrylate and methacrylic acid.

9. The resinous composition of claim 6 wherein the thermosetting interpolymer is an interpolymer of acrylamide, styrene, methyl methacrylate and methacrylic acid.

10. The resinous composition of claim 6 wherein the thermosetting interpolymer is an interpolymer of acrylamide, styrene and methacrylic acid.

11. The resinous composition of claim 4 wherein the thermoplastic polymer is an interpolymer of methyl methacrylate in polymerized form.

12. The resinous composition of claim 11 wherein the thermoplastic polymer is a homopolymer of methyl methacrylate.

13. The resinous composition of claim 11 wherein the thermoplastic polymer is a copolymer of methyl methacrylate, dibutyl itaconate and methacrylic acid.

14. The resinous composition of claim 11 wherein the thermoplastic polymer is an interpolymer of methyl methacrylate, lauryl methacrylate and methacrylic acid.

15. The resinous composition of claim 11 wherein the thermoplastic polymer is an interpolymer of methyl methacrylate, butyl acrylate, methacrylic acid and hydroxy propyl methacrylate.

16. The resinous composition of claim 11 wherein the thermoplastic polymer is an interpolymer of methyl methacrylate, 2-ethylhexyl methacrylate and methacrylic acid.

17. A resinous composition consisting essentially of from about 35 to about 90 percent by weight of the total resinous composition of an interpolymer consisting of 68 percent by weight of methyl methacrylate, 30 percent by weight of lauryl methacrylate, and 2 percent by weight of methacrylic acid, and from 10 percent to about 65 percent by weight of a thermosetting interpolymer consisting of about 10 percent by weight of acrylamide, about 40 percent to 45 percent by weight of styrene, about 40 to 45 percent by weight of ethyl acrylate and about 2.5 percent of methacrylic acid all based on the weight of the interpolymer wherein the said thermosetting interpolymer is characterized by having at least one hydrogen atom of an amino nitrogen replaced by the structure $$-\underset{\underset{R}{|}}{C}HOR_1$$

wherein $R_1$ represents a butyl radical and R represents hydrogen.

18. A resinous composition consisting essentially of from about 35 percent to about 90 percent by weight of the total resinous composition of an interpolymer consisting of 68 percent by weight of methyl methacrylate, 30 percent by weight of lauryl methacrylate, and 2 percent by weight of methacrylic acid, and from 10 percent to about 65 percent by weight of a thermosetting interpolymer consisting of about 10 percent by weight of acrylamide, about 40 to 45 percent by weight of styrene, about 40 to 45 percent by weight of ethyl acrylate and about 2.5 percent of methacrylic acid all based on the weight of the interpolymer wherein the said thermosetting interpolymer is characterized by having at least one hydrogen atom of an amino nitrogen replaced by the structure $$-\underset{\underset{R}{|}}{C}HOR_1$$

wherein $R_1$ represents a butyl radical and R represents hydrogen.

References Cited by the Examiner

UNITED STATES PATENTS

| | | | |
|---|---|---|---|
| 3,037,963 | 6/1962 | Christenson | 260—72 |
| 3,062,776 | 11/1962 | Gaylord | 260—901 |

FOREIGN PATENTS

| | | |
|---|---|---|
| 467,492 | 6/1937 | Great Britain. |

MURRAY TILLMAN, *Primary Examiner.*

LEON J. BERCOVITZ, *Examiner.*

J. A. KOLASCH, J. WHITE, *Assistant Examiners.*